Figure 5:
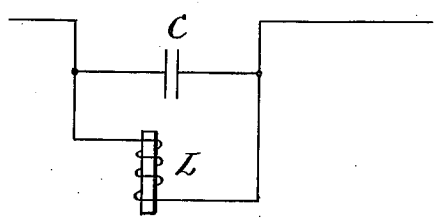

T. DOUGLAS AND W. T. TABB.
ELECTRICALLY OPERATED SPEED REGULATOR.
APPLICATION FILED JUNE 23, 1919.
1,390,510.
Patented Sept. 13, 1921.
2 SHEETS—SHEET 1.
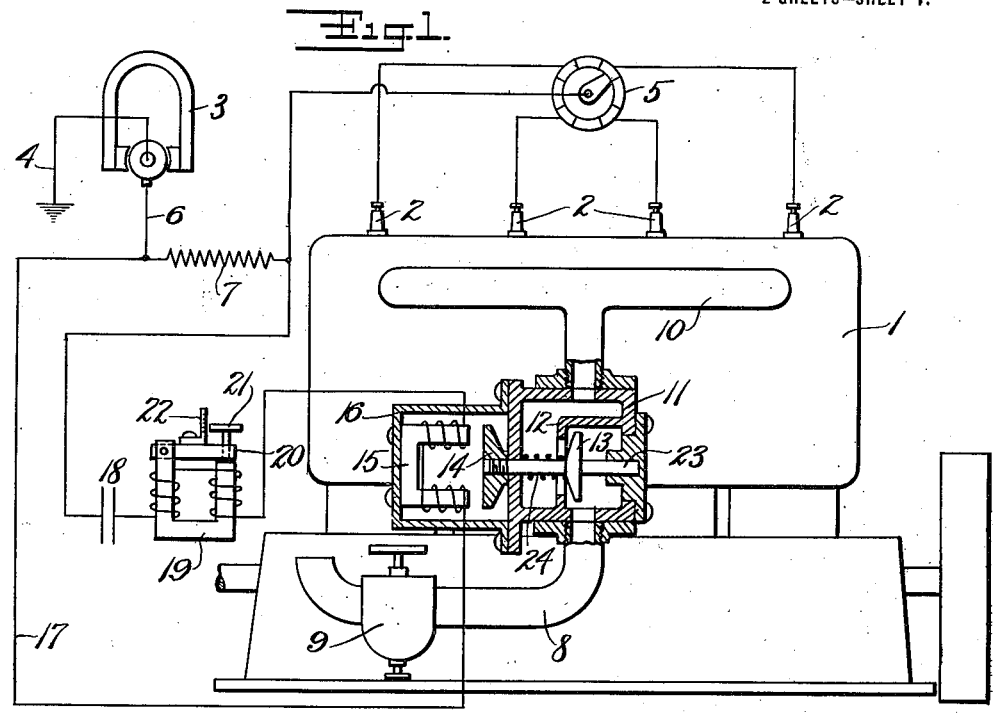
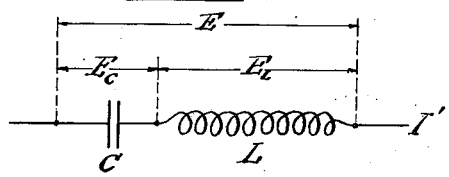
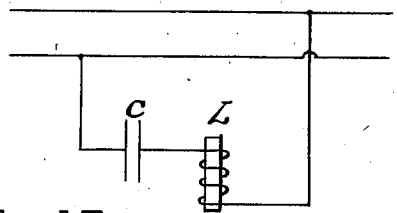
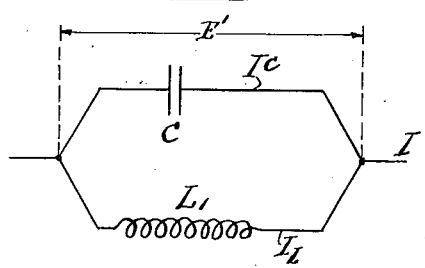
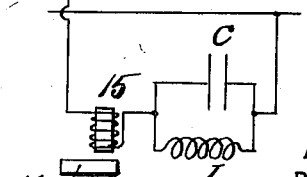
INVENTORS
THEODORE DOUGLAS
WARNER T. TABB
BY
William F. Nickel
ATTORNEY T. DOUGLAS AND W. T. TABB.
ELECTRICALLY OPERATED SPEED REGULATOR.
APPLICATION FILED JUNE 23, 1919.

INVENTORS
THEODORE DOUGLAS
WARNER T. TABB
BY
William F. Nickel
ATTORNEY

UNITED STATES PATENT OFFICE.

THEODORE DOUGLAS, OF SCARBORO, AND WARNER T. TABB, OF BROOKLYN, NEW YORK, ASSIGNORS TO DUPLEX ENGINE-GOVERNOR COMPANY, INC., OF BROOKLYN, NEW YORK, A CORPORATION OF NEW YORK.

ELECTRICALLY-OPERATED SPEED-REGULATOR.

1,390,510.        Specification of Letters Patent.    Patented Sept. 13, 1921.

Application filed June 23, 1919. Serial No. 306,185.

*To all whom it may concern:*

Be it known that we, THEODORE DOUGLAS, a citizen of the United States, residing in Scarboro, in the county of Westchester and State of New York; and WARNER T. TABB, a citizen of the United States, and a resident of Brooklyn, in the county of Kings and State of New York, have invented certain new and useful Improvements in Electrically-Operated Speed-Regulators, of which the following is a specification.

We have invented an improved electrically operated speed regulator; particularly an electrically operated speed regulator for internal combustion engines and other power-developing and power-utilizing units, to regulate the supply of motive agent and maintain a selected speed.

An object of our invention is to provide for the regulation of an internal combustion engine, for example, by limiting the speed thereof through the instrumentality of electrical devices which require a minimum of extra equipment for the engine; which are normally inoperative, but adapted to be actuated at the proper time by the accessories generally carried by the engine; and which are simple, compact, easily attached and capable of affording a quick, certain and efficient regulating action.

Another object of our invention is to provide an electrically operated speed regulator for an internal combustion engine to be permanently connected with a part of the ignition system of the latter without switches or the like and without interfering with the usual functions of said system; and designed to remain inactive at ordinary speeds, but to become effective to diminish the supply of motive agent, under predetermined conditions.

Other objects and advantages of our invention are set forth in the following description, taken in connection with the accompanying drawings, which illustrate the best embodiments of our invention now known to us. This disclosure, however, is explanatory only, and we may of course resort to forms which are not specifically shown herein, but are nevertheless within the scope and spirit of our invention as the same is indicated by the general meanings of the terms in which the appended claims are expressed and by variations in the phrasing of the same.

Figure 11:
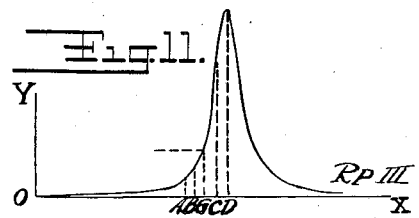

On the drawings:

Figure 1 is an assembly view, more or less diagrammatic, showing our invention in operative relation to an internal combustion engine;

Figs. 2 and 3 present fundamental circuits;

Figs. 4 to 10 inclusive illustrate modifications of the arrangement of the electrical devices shown in Figs. 1 and 2;

Fig. 11 is a view of a curve of speed and current, depicting the relation of the speed of the engine or other unit to the current which causes the regulator to affect same; and Fig. 12 shows another form of our invention.

The same numerals identify the same parts throughout.

In the detailed account of our invention that now proceeds, we use the numeral 1 (Fig. 1) to indicate the body of an internal combustion engine embracing a plurality of cylinders, each of which is provided with a suitable igniter, such as a high tension spark-plug 2. These igniters are connected with the ignition system of the engine, which includes a source of electric energy such as a magneto 3, to furnish the ignition current. This magneto may be conceived as being of the high tension type, with one secondary terminal grounded on the engine, as indicated at 4; and the other terminal of the secondary circuit connected to a distributer 5. This distributer may be of the usual construction, including a number of fixed contracts, each of which is connected to one of the spark-plugs 2; and a rotatable contact joined by suitable conductors 6 in any suitable way to the secondary circuit of the ignition system. The resistance 7 is placed in series with the magneto 3 and the distributer 5, and the movable contact of the distributer of course serves to connect the magneto through the fixed contacts with each of the spark-plugs 2 in turn, so that the fuel in the cylinders may be ignited at the proper point in the cycle. Both the magneto and the distributer will of course be driven in step with the engine, and the armature or other movable part of the magneto will run at a rate that bears a fixed ratio to the speed of the crank-shaft of the engine.

The engine 1 is provided with a supply pipe 8 through which the motive agent, such as the combustible mixture, is conducted to the inside of the power cylinders. This supply pipe 8 is joined at one end to a carbureter 9, and at the other end to intake manifold 10; and between the carbureter 9 and manifold 10 we insert into the line of the supply pipe a valve casing 11. This valve casing 11 is provided with an internal web or partition 12 having a port controlled by a valve 13; this valve seating against the edge of this port in the web 12 in closed position and permitting the combustible mixture to flow through the port when in open position. Normally the valve is kept open, so that the flow of fuel to the engine can take place freely; but it is connected to an armature 14 to be attracted by an electro-magnet 15 as soon as the limiting speed of the engine is approached. The magnet 15 may be of any suitable type, comprising a core of magnetic material upon which are wound a suitable number of turns of insulated wire; one terminal of said turns being connected by a conductor 17 to one extremity of the resistance 7; and the other terminal of said turns being joined to one terminal of a condenser 18, the other terminal of said condenser being joined to the opposite terminal of resistance 7. Therefore, as shown in Fig. 1, the resistance 7, which is supposed to be non-inductive resistance and the circuit for closing the valve 13, are arranged in parallel with each other. As the valve 13 is normally held open, the engine 1, after starting, is free to accelerate until it reaches a certain speed at which the valve should be moved toward its seat in the web 12 to prevent the speed of the engine from growing materially greater. This speed will be approximately the speed at which the frequency of the magneto 3 will produce the electrical phenomenon known as "resonance" in the circuit comprising the conductor 17, magnets 15 and 19, and condenser 18. Obviously, after the engine has been started, it will run slowly at first and then faster, and the frequency of the magneto 3 will change accordingly, until resonant speed is reached. However, the impedance of the circuit in parallel with the resistance 7 will normally be so great that practically all the current supplied by the magneto will pass through the resistance 7 by way of the distributer to the spark-plugs; and no current at all will flow through the circuit in parallel with the resistance 7 to close the valve 13. But as resonance nears, the impedance of the parallel circuit comprising the magnet 15 and condenser 18 will decrease greatly, and a large part of the current will then pass around the resistance 7. Then the armature 14 will be attracted and the valve will be moved toward closing position, permitting only sufficient fuel to continue flowing through the supply pipe 8 to enable the engine to drive its load at the approximately constant speed desired. Should this at any time be exceeded, more current will flow through the circuit in parallel with the resistance 7 and the valve 13 will be still further closed. The limiting speed of the engine being determined in advance, and the speed of the magneto always bearing a fixed ratio to the engine speed, the speed of the magneto at which resonance should take place can easily be calculated and resonance procured by adjusting the capacity and the inductance of the circuit in parallel with the resistance 7 in accordance with well known electrical laws.

Generally speaking, in any circuit carrying alternating current and including both inductance and capacity, resonance can be produced, if the frequency is made to bear the proper relation to the inductance and the capacity.

Some of the phenomena which take place in alternating current circuits, particularly when resonance occurs, may conveniently be considered at this point in order to make clear the nature of this invention. For this purpose reference is had to Figs. 2 and 3.

Fig. 2 shows a circuit which comprises a condenser C and an inductance coil L joined in cascade; and Fig. 3 shows an alternating circuit in which the same electrical elements are joined in multiple; the terms "in cascade" and "in multiple" being used to designate the connection of the condenser and the inductance coil with each other; while the terms "series" and "shunt" will be used later to designate the manner of connecting this combination to the line which supplies the current.

The impedance of a condenser, that is, its tendency to oppose the flow of alternating current, depends on the frequency or number of reversals per second of the current, and is greater for low frequencies than for high frequencies; while the impedance of an inductance coil also depends upon the frequency but is greater for high frequencies than for low.

Now the impedance of a cascade arrangement, such as is shown in Fig. 3, is great for low frequencies and for high frequencies; but for any given condenser and coil, it is small for one particular frequency in between. At this value of the frequency, resonance takes place; that is the impedance of the condenser is more or less completely nullified by the impedance of the inductance coil and vice versa; and the total impedance of the combination is less in general than the impedance of either one separately; and depends only on the ohmic resistance of the current. For a given voltage E across the combination, the current flowing will be very much larger at resonant frequency than for any other frequency. For a given current, the voltage E across the combination will be very much lower at resonant frequency than at any other frequency and will in general be less than the voltage Ec across the condenser or EL across the inductance coil. At resonance a multiplication of voltage takes place, that is in general the voltage Ec across the condenser and the voltage EL across the inductance will both be greater than the total voltage E supplied to the combination.

On the other hand, the impedance of a condenser and inductance coil in multiple as shown in Fig. 3, is low for low frequency and also for high frequency; but for the frequency at which resonance occurs the impedance is high. For a given voltage E across the combination the total current I will be less at resonant frequency than at any other frequency and will in general be less than the current Ic through the condenser or IL through the inductance coil. For a given total current I the voltage E will be greater at resonant frequency than at any other frequency. At resonance a multiplication of current takes place; that is in general the current Ic through the condenser and the current IL through the inductance coil will both be greater than the total current I supplied to the combination.

These characteristics of circuits in which resonance can be produced as outlined above, give the basis or principle of a regulator according to our invention, which resides mainly in the utilization of electrical resonance to cause valve 13 to control the engine in the required manner. In the above description and in what follows, herein, an alternating current and voltage have been assumed; but the operation will be the same if the current and voltage do not actually alternate but merely vary periodically in some other way, as by fluctuating or pulsating in time with the revolution of the crankshaft.

Referring now further to Fig. 1, we include in the circuit of the electro-magnet 15 and the condenser 18, another electro-magnet 19. This electro-magnet 19 will have a magnetic core wound with turns of insulated wire similar to the electro-magnet 15, and the core may have any convenient shape. The capacity in this circuit comprising the magnets 15 and 19 and the condenser 18, will be provided by the condenser 18; and the inductance will be due to both magnets 15 and 19. These magnets are shown as being of approximately horse-shoe form and the magnet 19 has an armature 20 movably mounted adjacent to the poles thereof as by pivotally connecting it to the end of one of the limbs of magnet 19. The free end of this armature 20 is provided with an adjusting screw 21 adjacent to the head of which this armature carries the gage 22. The adjusting screw 21 projects through the armature 20 and can be made to abut against the other limb of the magnet. This adjusting screw is made of non-magnetic material such as brass; and serves the purpose of limiting the movement of the armature 20 toward the adjacent pole of the magnet 19. When turned back as far as possible this screw may permit the end of the armature to make actual contact with the adjacent pole of the magnet 19 without any intervening air-gap; and when turned forward, this screw may prevent contact with the free end of the armature and the adjacent pole of the magnet 19; and thus introduce an air-gap of greater or less length in the magnetic circuit; and when the adjusting screw 21 is in such position as to allow the armature 20 to come into direct contact with the adjacent pole of the magnet 19, the reluctance of the magnetic circuit is relatively small and the inductance is high. On the other hand, when there is an air-gap between the free end of the armature 20 and the adjacent pole of the magnet 19, the reluctance is greater and the inductance less. Hence by manipulating the adjusting screw 21 the limiting speed of the engine can be altered accordingly, because the inductance of the regulator circuit is thus altered and the frequency at which resonance will occur is correspondingly altered. The gage 22 may be graded and may bear a scale of engine speeds, so that the attendant need only turn the screw 21 to bring the head opposite any graduation to fix the limiting speed of the engine as desired.

Of course other methods of changing the limiting speed may be adopted. For example, instead of altering the reluctance of the magnetic circuit of the magnet 19 as described in connection with Fig. 1, we many arrange to change the number of turns of wire wound upon this magnet or upon the magnet 15, or both. Likewise, the resonant frequency may be altered by varying the area of the condenser plates 18 or the distance between such plates; or the quality of material separating them.

In Fig. 11 we show the curve of current in the regulator circuit in parallel with the resistance 7 for different speeds of the engine 1. This view comprises a pair of axes OX and OY, the speeds being plotted with reference to the former axis, and the current, with reference to the latter; that is to say, for a given speed, the value of the current can be obtained from the height of an ordinate erected at a selected point on the line OX; and of course parallel to the line OY. It will be observed that the curve of current plainly indicates that the value of the current is greatest in the regulator circuit for a particular speed, this speed being represented by the distance OD in Fig. 11, and being the speed at which full resonance takes place. For a considerable range of speed, after the engine starts, the curve of current runs close to the horizontal axis, and the current supplied to the regulator is therefore very small. When a certain speed has been reached, the curve of the current begins to rise very sharply and continues to rise sharply until the full resonant speed is attained, beyond which the current curve again drops. For example, if the distance OA in Fig. 11, be taken slightly less than the limiting speed, the current begins to increase at a relatively rapid rate when this speed has been reached, because the impedance lessens as full resonance approaches, and by the time the speed of the engine has risen to a value represented by the distance OB, the current in the regulator circuit in parallel with the resistance 7, will have been augmented to such a degree that it acts through the magnet 15 to exert a material pull upon the armature 14; thus drawing the valve 13 toward closed position, and decreasing the supply of fuel to the engine. The acceleration of the engine will thus be checked. If, however, the speed should increase still further to the value OC for instance, the current supplied to the magnet 15 will be so great that the valve 13 will be closed to such a degree that the amount of fuel supplied to the engine will be insufficient to enable the engine to drive its load at that particular speed, and so the speed of the engine will decrease. In general therefore, some stable speed OG, between OB and OC, will finally be reached and will be maintained by the governor, at which speed exactly sufficient current will flow in the windings of the magnet 15 to maintain the valve 13 in such a position that the amount of fuel supplied to the engine is exactly sufficient to enable the engine to drive its load at that particular speed.

Owing to the steepness of the portion of the curve adjacent to the point corresponding to the governing speed, the governor will be very sensitive and will allow only a small variation of speed above and below the particular value for which it is adjusted.

Figure 6:
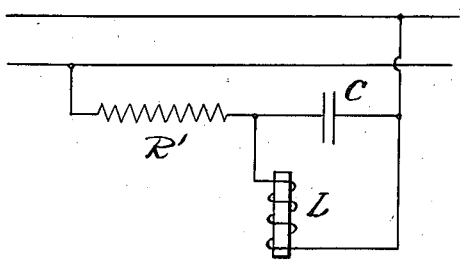
Figure 7:
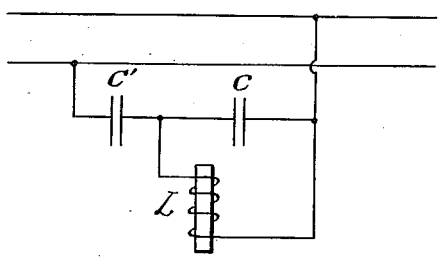
Figure 8:
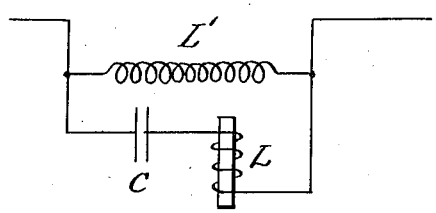

Figs. 4 to 10 inclusive, illustrate other methods of arranging the inductance and the capacity in relation to each other and with reference to the main circuit. All these arrangements, however, are governed by the principles discussed in connection with what is illustrated in Figs. 1, 2 and 3. In Fig. 2 the capacity and inductance are in cascade, and in Fig. 3 they are in multiple, as already stated. In Fig. 4 the capacity and the inductance are in cascade with each other, and in shunt across the ignition circuit. In Fig. 5 the inductance and capacity are in multiple with each other, and in series with the ignition circuit. Fig. 6 shows the inductance and capacity in multiple with each other and in shunt across the ignition circuit but in series with resistance R'. Fig. 7 shows the capacity and inductance in multiple and in shunt across the line through another condenser which is in series with the combination; and Fig. 8 shows a condenser and inductance coil in cascade with each other, and in series with the main or ignition circuit, a second inductance coil being added which is also in series with the main circuit but in multiple with the combination. Fig. 1 shows the capacity and inductance in cascade and in series with the ignition circuit but in multiple with the resistance R which is also in series with the ignition circuit. The auxiliary condenser in Fig. 7 is indicated by the reference character C' and the auxiliary inductance coil in Fig. 8 is indicated by the reference character L'. In Fig. 6 the resistance, indicated by the reference character R', is an auxiliary resistance.

For a low tension circuit, the arrangement shown in Fig. 4 may be selected; the main conductors in this case leading from a source of electricity to the primaries of induction coils or other devices by which ignition is effected.

Figure 9:
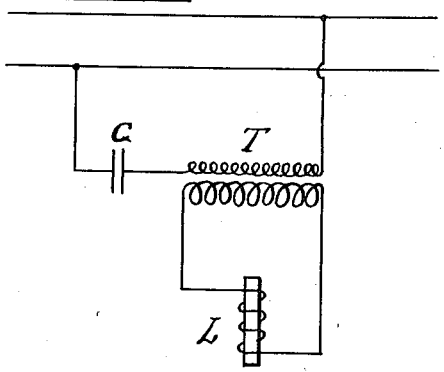
Figure 10:
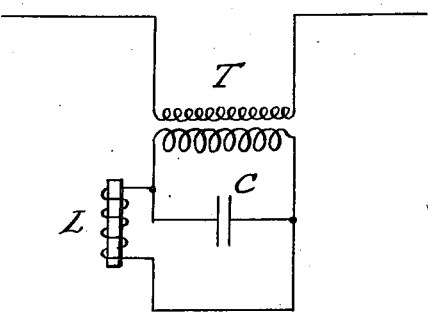

Figs. 9 and 10 represent instances in which a transformer is inserted to change the voltage and current values of the electrical supply to those which can best be utilized by the resonant circuit of the governor. In Fig. 9 the capacity and inductance are in cascade and are connected in shunt across the ignition circuit, a transformer being inserted between the condenser and the inductance coil.

In Fig. 10 the capacity and inductance are in multiple and are connected in series with the ignition circuit; the transformer being inserted between the resonant multiple arrangement and the ignition circuit.

The principle dwelt upon in the foregoing, is capable of being utilized not only upon an internal combustion engine, but also upon other power units, such as a steam engine driving an alternator, or upon a direct current electric motor driving an alternator; or in general for regulating the speed of any power-developing or power-utilizing unit when a supply of alternating or otherwise periodically varying current is available; the frequency of said current depending upon the speed of the unit.

With an internal combustion engine, the motive agent to be throttled will be the gaseous fuel; with a steam engine it will be the steam; while for an electrical machine the motive agent to be affected will be the electric current in one of the circuits of the machine. For water wheels, turbines, compressed air motors and other machines the governing action will be such as to meet the conditions and requirements peculiar to these machines.

In some cases it may be advisable that the magnet of the resonant circuit be normally operative and release its armature only when the resonant speed is attained.

Methods of connection may be devised to meet these requirements, utilizing the fundamental circuits shown by Figs. 2 and 3 and the general principles of resonant circuits set forth above. Such a method is diagrammatically indicated in Fig. 12, whereon a condenser C and an inductance coil L are in multiple with each other, but in shunt with the line; a magnet 15 being in cascade with the combined elements C and L. Here current normally flows through the magnet 15, and the armature is attracted permanently; but at resonance the impedance becomes high and the magnet 15 weakens and releases the armature. If this armature be connected to a throttle valve having a spring tending to close it, the valve will remain open till resonance occurs. Then the magnet 15, weakening, will allow the spring to move the valve to more or less closed position.

In Figs. 4 to 10 inclusive the inductance coil may serve also as a magnet coil, such as the coil 15, for attracting the armature 14; or if desired, an additional coil with core to serve as an electro-magnet for attracting the valve may be provided.

The magnet 15 in Fig. 1 may be inclosed in an extension 16 of the casing 11. This casing may be of any preferred construction and be inserted into the line of the pipe 8 in any suitable way. The type of valve 13, further, may be varied as circumstances demand. It is shown mounted on a stem 23, with a spring 24 encircling the stem, to hold the valve normally open. The stem is slidably mounted in bearings in the casing 11; and one end projects out of the casing 12 into the extension 16, in which it carries the armature 14. It will be understood that when any one of the arrangements illustrated in Figs. 3 to 10 inclusive is employed, the curve of current through the magnet which is to attract the armature 14 will be of the same general shape as indicated in Fig. 11. In the case of the arrangement shown in Fig. 12 the curve will be inverted from its shape and position as shown in Fig. 11.

The circuit connected to the main or ignition circuit, and containing the inductance and capacity constitute a governing system, including a regulator, dependent on the characteristics of the ignition circuit for its proper function and effect in operating the valve 13.

Having described our invention, what we believe to be new and desire to secure and protect by Letters Patent of the United States is:—

1. The combination of an internal combustion engine having a throttle valve and an ignition system including a high-tension magneto, a resistance in the high-tension circuit of the magneto, and a circuit in parallel with said resistance, said circuit including an electro-magnet to control said valve, and containing inductance and capacity to produce resonance to enable said valve to be actuated.

2. The combination of an internal combustion engine having a throttle valve and an ignition system including a high tension magneto, a resistance in the high tension circuit of the magneto, and a circuit in parallel with said resistance, said circuit including an electromagnet to control said valve, inductance and capacity to produce resonance to enable said valve to be actuated and devices for adjusting said inductance and capacity relative to each other.

3. The combination of an internal combustion engine having a throttle valve and an ignition system including an electric circuit and a source of electric current, and a second circuit associated with said first named circuit for periodically varying current, said circuit including an electric magnet to control the valve and containing inductance and capacity, to produce resonance to enable the valve to be actuated to affect the engine at a predetermined speed of the latter.

4. The combination of an internal combustion engine having a throttle valve and an ignition system including a circuit and a source of electric current, and a circuit associated with said first named circuit for periodically varying current, said last named circuit including an electric magnet to control the valve, inductance and capacity to produce resonance to enable the valve to be actuated to affect said engine at a predetermined speed of the latter, and devices for varying said inductance and capacity relatively to each other.

In witness whereof, we have signed our names to this specification this 12 day of May, 1919.

THEODORE DOUGLAS.
WARNER T. TABB.